(12) United States Patent
Oishi et al.

(10) Patent No.: US 7,060,246 B2
(45) Date of Patent: Jun. 13, 2006

(54) MAGNESIUM HYDROXIDE PARTICLES, METHOD OF THE PRODUCTION THEREOF, AND RESIN COMPOSITION CONTAINING THE SAME

(75) Inventors: Shunji Oishi, Sakaide (JP); Taro Ando, Sakaide (JP); Makoto Yoshii, Sakaide (JP); Wataru Hiraishi, Sakaide (JP)

(73) Assignee: Kyowa Chemical Industry, Co., Ltd., Kagawa (JP)

(*) Notice: Subject to any disclaimer, the term of this patent is extended or adjusted under 35 U.S.C. 154(b) by 230 days.

(21) Appl. No.: 10/627,620

(22) Filed: Jul. 28, 2003

(65) Prior Publication Data

US 2003/0235693 A1 Dec. 25, 2003

Related U.S. Application Data

(62) Division of application No. 09/622,002, filed as application No. PCT/JP99/06990 on Dec. 13, 1999, now Pat. No. 6,676,920.

(30) Foreign Application Priority Data

Dec. 14, 1998 (JP) .......................... 10-354258
Jul. 8, 1999 (JP) .......................... 11-195061

(51) Int. Cl.
*B32B 5/16* (2006.01)
*C01F 11/02* (2006.01)

(52) U.S. Cl. .................. 423/635; 428/330; 428/332; 428/402; 428/920

(58) Field of Classification Search .............. 428/403, 428/407, 330, 332, 920; 423/635
See application file for complete search history.

(56) References Cited

U.S. PATENT DOCUMENTS 3,232,708 A * 2/1966 Edward .................. 423/161
3,508,869 A * 4/1970 Shoaff .................... 423/639

(Continued)

FOREIGN PATENT DOCUMENTS

| CN | 1148570 | 4/1997 |
| EP | 0 221 449 | 5/1987 |
| EP | 0 780 425 | 6/1997 |

(Continued)

*Primary Examiner*—H. Thi Lê
(74) *Attorney, Agent, or Firm*—Sherman & Shalloway

(57) ABSTRACT

Provided are magnesium hydroxide particles having a hexagonal crystal form and having an aspect ratio (H) which satisfies the following expression (I), $$0.45 \cdot A \cdot B < H < 1.1 \cdot A \cdot B \qquad (I)$$

(wherein H is an aspect ratio, A is an average secondary particle diameter (μm) of all of the particles measured by a laser diffraction scattering method and B is a specific surface area (m²/g) of all of the particles measured by a BET method), a flame-retardant comprising the particles, a flame-retardant resin composition comprising 100 parts by weight of a synthetic resin and a 5 to 300 parts by weight of the magnesium hydroxide particles, and a molded article therefrom.

The magnesium hydroxide particles are hexagonal single crystals, the hexagonal form thereof are not necessarily required to be regular hexagonal, and the size thereof are not necessarily constant. However, the aspect ratio thereof has a specific value in relation to the specific surface area and the average particle diameter, and the magnesium hydroxide particles have excellent properties as a flame retardant for synthetic resins.

27 Claims, 1 Drawing Sheet

U.S. PATENT DOCUMENTS

| | | | | |
|---|---|---|---|---|
| 4,246,254 A | * | 1/1981 | Miyata et al. | 423/635 |
| 4,987,173 A | * | 1/1991 | Nomura et al. | 524/423 |
| 5,438,084 A | * | 8/1995 | Imahashi | 523/440 |
| 5,476,642 A | * | 12/1995 | Skubla et al. | 423/162 |
| 5,759,509 A | * | 6/1998 | Miyata et al. | 423/594.2 |
| 6,254,847 B1 | * | 7/2001 | Kurisu et al. | 423/594.4 |
| 6,676,920 B1 | * | 1/2004 | Oishi et al. | 423/635 |

FOREIGN PATENT DOCUMENTS

| | | |
|---|---|---|
| JP | 2048414 | 2/1990 |
| JP | 2164713 | 6/1990 |
| JP | 3170325 | 7/1991 |
| JP | 4142360 | 5/1992 |
| JP | 7061812 | 3/1995 |

* cited by examiner

F I G. 1
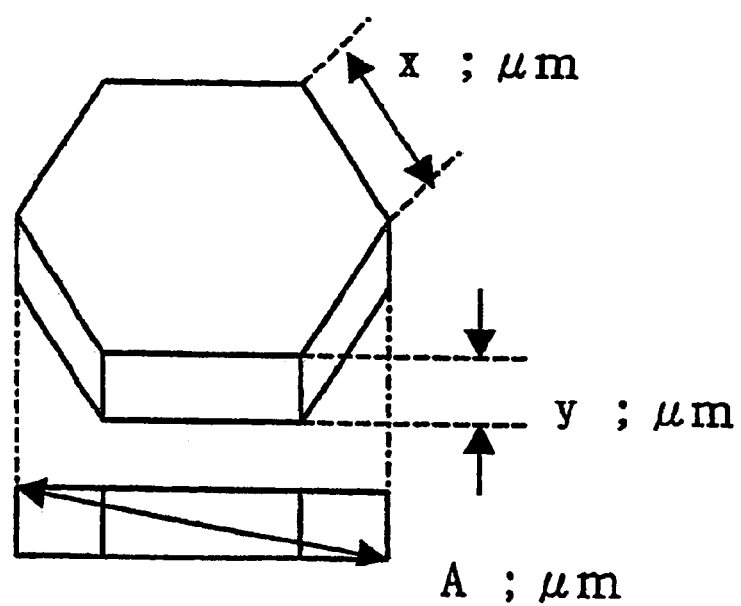

MAGNESIUM HYDROXIDE PARTICLES, METHOD OF THE PRODUCTION THEREOF, AND RESIN COMPOSITION CONTAINING THE SAME

CROSS REFERENCE TO RELATED APPLICATION

This application is a divisional of application Ser. No. 09/622,002, filed on Aug. 11, 2000, now U.S. Pat. No. 6,676,920, which is a U.S. nationalization of International Application PCT/JP99/06990, filed Dec. 13, 1999, which claims priority from Japanese Patent Applications 10/354258, filed Dec. 14, 1998, and 11/195061, filed Jul. 8, 1999.

FIELD OF THE INVENTION

The present invention relates to magnesium hydroxide particles having a novel form each and a process for the production thereof. More specifically, the present invention relates to magnesium hydroxide particles having a hexagonal crystal form each and having a specific aspect ratio, and a method of the production thereof. Further, the present invention also relates to a flame retardant and a resin composition containing the above magnesium hydroxide particles.

PRIOR ART OF THE INVENTION

Magnesium hydroxide particles have been known for a long time and are used for medical and industrial products in broad fields. For example, the medical products include an antacid, an evacuant, medicaments for animals, etc., and the industrial products include a flame retardant which imparts a thermoplastic resin flame resistance when incorporated into the resin, an adsorbent for an oil-containing effluent, a soot desulfurizer, a waste water neutralizer and a soil improver.

A variety of methods of producing magnesium hydroxide particles have been hitherto available, such as a method in which ion bittern, seawater or dolomite is used as an Mg source and lime or sodium hydroxide is used as an alkali source, a method which is based on the hydration of magnesium oxide and a method in which an Mg salt and ammonia are allowed to react deposit a magnesium hydroxide crystal. In conventional magnesium hydroxide, however, the form of magnesium hydroxide particles is determined depending upon a production method, so that a different production method has been required for obtaining a magnesium hydroxide particles having a different form.

Meanwhile, an organohalogen compound or antimony trioxide is widely used as a flame retardant for synthetic resins.

A halogen-containing flame retardant comprising an organohalogen compound, antimony trioxide or a combination of these generates a large quantity of smoke and toxic gases in fire, and it has therefore socially caused problems. Flame retardants have been therefore studied for avoiding the use of the halogen-containing flame retardant so as to make its amount as small as possible. As a result, magnesium hydroxide particles have come to be evaluated as an effective flame retardant. When magnesium hydroxide particles are incorporated into a resin, the amount of smoke during combustion is small, and they are non-toxic. Further, magnesium hydroxide particles can be applied to a broad range of resins since they are free from a phenomenon that those like aluminum hydroxide particles are dehydrated and decomposed at a resin processing temperature to foam a resin molded article.

Synthetic resins containing a high concentration of magnesium hydroxide particles as a flame retardant have come to be widely used in electric cables for use in/for an atomic power plant, vessel, an automobile, a subway and communications in an underground or tunnel passage, in a part for an electric home appliance and an electronic machine or equipment and in a construction material.

PROBLEMS TO BE SOLVED BY THE INVENTION

When a synthetic resin is flame-retarded with magnesium hydroxide particles, the synthetic resin is required to contain a high concentration of magnesium hydroxide particles, and there is caused a problem that a poor appearance is formed or that properties of a composition of the synthetic resin are deteriorated. For overcoming the above problems, there have been proposed flame retardant of magnesium hydroxide particles which are surface-treated with a higher fatty acid or various coupling agents. However, the above problems have not yet essentially solved.

The present inventors have therefore made diligent studies for obtaining novel magnesium hydroxide particles having an unconventional specific form. It has been therefore found that magnesium hydroxide particles having a relatively large aspect ratio unlike conventional one and having a hexagonal crystal form can be obtained by adding a specific acid or a salt thereof in the step of producing magnesium hydroxide particles from magnesium chloride or magnesium oxide as a raw material. According to the present invention, particularly, there are provided magnesium hydroxide particles having an aspect ratio of a specific value with regard to a specific surface area and an average particle diameter.

In the present invention, studies have been further made concerning use of the above magnesium hydroxide particles having a specific form, and it has been found that the magnesium hydroxide particles have excellent properties as a flame retardant for synthetic resins.

MEANS TO SOLVE THE PROBLEMS

According to the present invention, there is provided magnesium hydroxide particles having a hexagonal crystal form and having an aspect ratio (H) which satisfies the following expression (I), $$0.45 \cdot A \cdot B < H < 1.1 \cdot A \cdot B \tag{I}$$

wherein H is an aspect ratio, A is an average secondary particle diameter (μm) of all of the particles measured by a laser diffraction scattering method and B is a specific surface area (m²/g) of all of the particles measured by a BET method, and a flame retardant comprising the magnesium hydroxide particles.

According to the present invention, further, there are provided a flame-retardant resin composition comprising 100 parts by weight of a synthetic resin and 5 to 300 parts by weight of the above magnesium hydroxide particles, and a molded article produced therefrom.

The present invention will be explained further in detail hereinafter. First, the magnesium hydroxide particles having a hexagonal crystal form and the process for the production thereof, provided by the present invention, will be explained.

The magnesium hydroxide particles of the present invention are characterized by a hexagonal crystal form and a specific aspect ratio. The hexagonal crystal form is observed, for example, in a microscopic photograph of the particles taken at a magnification of 5,000 to 10,000 diameters. The magnesium hydroxide particles of the present invention are hexagonal single crystals, and the hexagonal form is not required to be of a regular hexagonal form. FIG. 1 shows a board having the form of a regular hexagon as a model for calculation of an aspect ratio. However, the hexagonal form may be a form having six sides forming the board as a total, and for example, may be a hexagon that the length of each of two sides opposed to each other is larger than the length of each of the other sides. Further, angles (interior angles) forming apexes of corners (six corners) formed by combinations of two sides in contact with each other may be 100° to 130° each. Further, the corners (six corners) formed by combinations of two sides in contact with each other may be partly rounded. When observed in an enlarged photograph, most (at least 90%, preferably at least 95%) of the magnesium hydroxide particles of the present invention have the above hexagonal crystal form, and the sizes of them are not necessarily uniform. However, the sizes (particles diameters) of the particles have a certain constant distribution width as will be described later, and one of the features of the magnesium hydroxide particles of the present invention is that the sizes of the particles are relatively uniform. The distribution of the particle diameters will be further explained later.

The magnesium hydroxide particles of the present invention have characteristic features that the single crystal thereof is hexagonal and that the aspect ratio (H) thereof is relatively large as compared with conventional ones. The range of the aspect ratio (H) is determined in correlation with values of an average secondary particle diameter (A) and a BET specific surface area (B) of the magnesium hydroxide particles. That is, the aspect ratio (H) is in the range which satisfies the following expression (I) with regard to a product (A×B) of the average secondary particle diameter (A) and the BET specific surface area (B).

$$0.45 \cdot A \cdot B < H < 1.1 \cdot A \cdot B \tag{I}$$

The range of the aspect ratio (H) is preferably a range which satisfies the following expression (I-a), more preferably a range which satisfies the following expression (I-b).

$$0.50 \cdot A \cdot B < H < 1.1 \cdot A \cdot B \tag{I-a}$$

$$0.55 \cdot A \cdot B < H < 1.0 \cdot A \cdot B \tag{I-b}$$

In the above expressions, A is an average secondary particle diameter (µm) of the magnesium hydroxide particles and B is a specific surface area (m$^2$/g) of the particles measured by a BET method.

When the aspect ratio (H) of the magnesium hydroxide particles is smaller than (0.45·A·B), the amount of particles having smaller aspect ratios is relatively large, and the properties of the magnesium hydroxide particles of the present invention are no longer obtained. Further, when the above aspect ratio is considerably small, the form of the magnesium hydroxide particles is no longer distinguishable from the form of conventional ones. When the aspect ratio (H) is larger than a value of (1.1·A·B), undesirably, it is difficult to produce such particles stably, and it is difficult to mix or disperse such particles with/in a resin uniformly when the particles are used as an additive for the resin.

The magnesium hydroxide particles of the present invention also have a characteristic feature in that they have a relatively narrow particle size distribution as described above, that is, they are uniform in particle size. This characteristic feature of the particle size distribution is represented by the fact that the volume ratio of magnesium hydroxide particles having a secondary particle diameter (F) satisfying the following expression (II), based on the total volume of the magnesium hydroxide particles, is at least 60%, preferably at least 65%, particularly preferably at least 70%.

$$0.3 \cdot A < F < 1.7 \cdot A \tag{II}$$

wherein F is a secondary particle diameter (µm) of the magnesium hydroxide particles, and A has the same definition as that in the above expression (I).

Desirably, the magnesium hydroxide particles of the present invention have an average secondary particle diameter (A), measured by a laser diffraction scattering method, of 0.15 to 5 µm, preferably 0.5 to 3.0 µm. With an increase in the average secondary particle diameter, the contact area to a resin decreases so that thermal stability is improved when they are used as an additive, for example, for a rubber, a ceramic or a resin. However, there are caused problems that mechanical strength decreases and that an appearance is poor. When the magnesium hydroxide particles of the present invention are used as an adsorbent or a neutralizing agent in the form of a powder or granules, the workability is more improved with an increase in the average secondary particle diameter thereof. When they are used for medical products, the occurrence of dust decreases and the workability is more improved with an increase in the average secondary particle diameter. When the average secondary particle diameter is too large, however, such particles are difficult to administer orally and a preparation is difficult to make.

Advantageously, the average secondary particle diameter (A) as a magnesium hydroxide is therefore in the range of 0.15 to 5 µm, preferably 0.5 to 3.0 µm.

Further, the BET specific surface area (B) of the magnesium hydroxide particles is 1 to 150 m$^2$/g, preferably 2 to 130 m$^2$/g, particularly preferably 3 to 90 m$^2$/g.

In the magnesium hydroxide particles of the present invention, preferably, all of (i) the aspect ratio (H), (ii) the average secondary particle diameter (A) and (iii) the BET specific surface area (B) thereof satisfy the above-described ranges.

The magnesium hydroxide particles of the present invention are suitable for use as a flame retardant for synthetic resins owing to the above (i) aspect ratio (H), (ii) average secondary particle diameter (A), (iii) BET specific surface area (B) and the characteristic feature of the particle size distribution. When the magnesium hydroxide particles are used as a flame retardant, they are incorporated in an amount of approximately 5 to 300 parts by weight, preferably approximately 10 to 250 parts by weight, per 100 parts by weight of a synthetic resin. When the magnesium hydroxide particles of the present invention are used as a flame retardant, the specific surface area thereof, measured by a BET method, is 30 m$^2$/g or less, preferably 3 to 20 m$^2$/g, particularly preferably 3 to 10 m$^2$/g. When a relatively large amount of magnesium hydroxide particles are incorporated into a synthetic resin as described above, a molded article is sometimes deteriorated due to heating during molding or heating during the use of the molded article, so that the molded article is degraded in properties inherent to the molded article, such as impact strength, elongation and tensile strength. This is caused by chemical properties of magnesium hydroxide particles, a kind and a content of impurities in particular, rather than by physical properties of the magnesium hydroxide particles.

According to studies by the present inventor, it has been found desirable that the total content, as a metal content, of an iron compound content and a manganese compound content as impurities in the particles in the magnesium hydroxide particles of the present invention is 0.01% by weight or less, preferably 0.005% by weight or less, in addition to the above-described physical properties which the magnesium hydroxide particles of the present invention have.

In the magnesium hydroxide particles of the present invention, preferably, the total content of (Fe+Mn) as metals is in the above range as described above. More preferably, the content, as a metal content, of heavy metal compounds which also include a cobalt compound, a chromium compound, a copper compound, a vanadium compound and a nickel compound is 0.02% by weight or less. That is, in the magnesium hydroxide particles, more advantageously, the total content of (Fe+Mn+Co+Cr+Cu+V+Ni) as metals is 0.02% by weight or less, preferably 0.01% by weight.

With an increase in the content of the iron compound and the manganese compound in the magnesium hydroxide particles, the thermal stability of a resin to which the magnesium hydroxide particles is incorporated is caused to be more degraded.

As long as (i) the aspect ratio (H), (ii) the average secondary particle diameter, (iii) the BET specific surface area and (iv) the total content of the iron compound and the manganese compound (or the total content of these and the other metal compounds described above) are within the above ranges, the magnesium hydroxide particles are excellent in compatibility with a resin, dispersibility, moldability and processability and can give a resin composition satisfying an appearance of a molded article, mechanical strength and flame retardancy and having good qualities.

For bringing the content of an iron compound and a manganese compound (and the other metal compounds as described above, as required) in the magnesium hydroxide particles into the above range, in the method of producing the magnesium hydroxide particles as will be described later, it is required to select those in which the content of these impurities is small, as magnesium chloride and magnesium oxide which are raw marterials, and further, when an alkaline compound is used, it is similarly required to use an alkaline compound having a high purity. Further, as materials for machines and equipment for a production process, such as a reactor, a reserve tank, tubings, dryer, a pulverizer, etc., it is required to use those from which the elution and inclusion of the above impurities are small.

The magnesium hydroxide particles of the present invention may be treated with a surface-treating agent before use.

Examples of the surface-treating agent that can be preferably used are as follows. Higher fatty acids having at least 10 carbon atoms such as stearic acid, erucic acid, palmitic acid, lauric acid and behenic acid; alkali metal salts of these higher fatty acids; sulfates of higher alcohols such as stearyl alcohol and oleyl alcohol; anionic surfactants such as sulfate of polyethylene glycol, amide-bonded sulfate, ester-bonded sulfate, ester-bonded sulfonate, amide-bonded sulfonate, ether-bonded sulfonate, ether-bonded alkylarylsulfonate, ester-bonded alkylarylsulfonate and amide-bonded alkylarylsulfonate; phosphate esters such as acid type, alkali metal salt or amine salt of a mono- or diester of orthophosphoric acid and oleyl alcohol or stearyl alcohol or a mixture of these; silane coupling agents such as vinyltrichlorosilane, vinyltrimethoxysilane, vinyltriethoxysilane, vinyltris(β-methoxyethoxy)silane, β-(3,4-epoxycyclohexyl) ethyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, N-β(aminoethyl)γ-aminopropylmethyldimethoxysilane, N-β(aminoethyl)γ-aminopropyltrimethoxysilane, N-β(aminoethyl)γ-aminopropyltriethoxysilane, γ-aminopropyltrimethoxysilane, γ-aminopropyltriethoxysilane, N-phenyl-γ-aminopropyltrimethoxysilane and γ-mercaptopropyltrimethoxysilane; titanate-containing coupling agents such as isopropyltriisostearoyl titanate, isopropyltris(dioctylpyrophosphate)titanate, isopropyltri(N-aminoethyl-aminoethyl)titanate, isopropyltridecylbenzenesulfonyl titanate, tetraoctylbis(ditridecylphosphite)titanate, bis(dioctylpyrophosphate)oxyacetatetitanate, isopropyltridecylbenzenesulfonyl titanate, tetraisopropylbis(dioctylphosphite)titanate, tetra(2,2-diallyloxymethyl-1-butyl)bis-(ditridecyl)phosphitetitanate, bis-(dioctylpyrophosphate)ethylenetitanate, isopropyltrioctanoyl titanate, isopropyldimethacrylisostearoyl titanate, isopropylisostearoyldiacryl titanate, isopropyltri(dioctylphosphate)titanate, isopropyltricumylphenyl titanate, dicumylphenyloxyacetatetitanate and diisostearoylethylenetitanate; aluminum-containing coupling agents such as acetoalkoxyaluminum diisopropylate; triphenylphosphite, diphenyl-tridecyl phosphate, phenyl-ditridecyl phosphite, phenyl-isodecyl phosphate, trinonylphenyl phosphate, 4,4'-butylidene-bis(3-methyl-6-tert-butylphenyl)-ditridecyl phosphite, trilauryl thiophosphite, and esters of polyhydric alcohol and fatty acid such as glycerin monostearate and glycerin monooleate.

When the magnesium hydroxide particles are surface-coated with the above surface-treating agent, the surface coating can be carried out by a wet or dry method known per se. In a wet method, for example, the surface-treating agent in the form of a liquid or an emulsion is added to a slurry of the magnesium hydroxide particles and these are mechanically fully mixed at a temperature up to approximately 110° C. In a dry method, the surface-treating agent in the form of a liquid, an emulsion or a solid is added to the magnesium hydroxide particles while the magnesium hydroxide particles are fully stirred with a mixer such as a Henschel mixer, and these are fully mixed under heat or under no heat. While the amount of the surface-treating agent can be selected as required, it is preferably approximately 10% by weight or less based on the weight of the magnesium hydroxide particles.

The surface-treated magnesium hydroxide particles may be washed with water, dehydrated, granulated, dried, pulverized and classified as required, to obtain them in the form of an end product.

According to studies made by the present inventors, it has been found that the magnesium hydroxide particles characterized by the above aspect ratio (H) can be obtained by a method in which magnesium hydroxide particles are produced from magnesium chloride and magnesium oxide as raw materials according to a method known per se, wherein the step of a reaction or hydrothermal treatment thereof is carried out in the presence of a specific amount of at least one compound selected from the group consisting of an organic acid, boric acid, silicic acid and water-soluble salts thereof. According to the present invention, therefore, the following methods (I) to (IV) are provided as methods of producing the above magnesium hydroxide particles.

Production Method (I)

The production method (I) is a method of producing magnesium hydroxide particles, which comprises reacting magnesium chloride with an alkaline substance in an aqueous medium to produce magnesium hydroxide particles, wherein the reaction is carried out in the presence of 0.01 to 150 mol %, based on the magnesium chloride, of at least one compound (to be sometimes referred to as "addition compound" hereinafter) selected from the group consisting of an organic acid, boric acid, silicic acid and water-soluble salts of these.

The production method (I) has a characteristic feature in the presence of a predetermined amount of an addition compound in a reaction system in the known production of magnesium hydroxide particles by a reaction of magnesium chloride with an alkaline substance in an aqueous medium. Examples of the alkaline substance preferably include ammonia, alkali metal hydroxide (typically, potassium hydroxide and sodium hydroxide) and calcium hydroxide. The amount of the alkaline substance per equivalent weight of magnesium chloride is 0.7 to 1.2 equivalent weights, preferably 0.8 to 1.1 equivalent weights.

The addition compound which is allowed to be present in the reaction system includes an organic acid, boric acid, silicic acid and water-soluble salts of these, and a combination of two or more compounds of these addition compounds may be used. The organic acid includes citric acid, tartaric acid, acetic acid and oxalic acid. The water-soluble salts of these organic acids, boric acid and silicic acid include alkali metal salt, alkaline earth metal salt, ammonium salt and organoamine salt. The addition compound is preferably selected from boric acid, silicic acid or water-soluble salts of these, and boric acid is particularly preferred.

The amount of the addition compound based on magnesium chloride is 0.01 to 150 mol %, preferably 0.02 to 140 mol %. When the amount of the addition compound is varied in the above range, the aspect ratio (H) of magnesium hydroxide particles to be obtained can be controlled as required. For obtaining magnesium hydroxide particles having a desired aspect ratio (H), the kind and amount of the addition compound can be determined mainly by a preliminary simple experiment. Generally, when the amount (concentration) of the addition compound is large, magnesium hydroxide particles having a large aspect ratio (H) tend to be obtained as compared with a case when it is small.

The preferred amount of the addition compound differs depending upon the kind of the addition compound. When the addition compound is boric acid, silicic acid or a salt of any one of these, the amount thereof based on magnesium chloride is preferably 0.01 to 20 mol %, particularly preferably 0.02 to 10 mol %. When the addition compound is an organic acid or a water-soluble salt thereof, the amount thereof based on magnesium chloride is preferably in the range of 0.1 to 140 mol %.

The above reaction of magnesium chloride with an alkaline substance in an aqueous medium (preferably, water) is carried out at a temperature in the range, generally, of 0 to 60° C., preferably 10 to 50° C., with stirring.

By the above reaction, there can be obtained magnesium hydroxide particles having the form intended in the present invention. However, by carrying out hydrothermal treatment, the obtained magnesium hydroxide particles can be formed into excellent particles having uniformity and having a narrow particle diameter distribution. Properly, the hydrothermal treatment is carried out in the aqueous medium at a temperature between 100° C. and 250° C., preferably between 120° C. and 200° C., for 20 minutes to 10 hours, preferably, for 30 minutes to 8 hours.

Production Method (II)

The production method (II) is a method of producing magnesium hydroxide particles, which comprises reacting magnesium chloride with an alkaline substance in an aqueous medium to obtain a slurry of magnesium hydroxide particles, and hydrothermally treating the slurry of magnesium hydroxide particles to produce the magnesium hydroxide particles, wherein the hydrothermal treatment is carried out in the presence of 0.01 to 150 mol %, based on the magnesium hydroxide, of at least one compound selected from the group consisting of an organic acid, boric acid, silicic acid and water-soluble salts of these.

The production process (II) substantially differs in that the addition compound is allowed to be present in the step of hydrothermal treatment without allowing the addition compound to be present in the step of the reaction in the above production process (I) (i.e., by carrying out the step of the reaction according to a method known per se). In the production method (II), therefore, the reaction between magnesium chloride and the alkaline substance is not altered with regard to the contents explained in the above production method (I) such as the kind and amount of the alkaline substance and reaction conditions. The kind of the addition compound in the hydrothermal treatment is also as described above, and further, the amount of the addition compound is substantially not altered except that the amount is based on the formed magnesium hydroxide.

Production Method (III)

The production method (III) is a method of producing magnesium hydroxide particles, which comprises hydrating magnesium oxide in an aqueous medium to produce magnesium hydroxide particles, wherein the hydration is carried out in the presence of 0.01 to 150 mol %, based on the magnesium oxide, of at least one compound selected from the group consisting of an organic acid, boric acid, silicic acid and water-soluble salts of these.

The above production method (III) has a characteristic feature in that a predetermined amount of the addition compound is allowed to be present in a reaction system in a known method per se of producing magnesium hydroxide particles on the basis of the hydration of magnesium oxide in an aqueous medium.

The above hydration is carried out with stirring at a temperature, generally, between 0° C. and 100° C., preferably 20° C. and 80° C., for 20 minutes to 5 hours, preferably for 30 minutes to 4 hours.

The addition compound to be added to the reaction system is selected from the same compounds as those explained in the above production method (I). The amount of the addition compound based on the magnesium oxide is 0.01 to 150 mol %, preferably 0.02 to 140 mol %. The kind and the amount of the addition compound are preferably as those explained in the above production method (I).

By the above hydration, magnesium hydroxide particles having the form intended in the present invention can be obtained. Further, by carrying out hydrothermal treatment, the obtained magnesium hydroxide particles can be formed into excellent particles having uniformity and having a narrow particle diameter distribution. Desirably, the hydrothermal treatment is carried out in the aqueous medium at a temperature between 100° C. and 250° C., preferably between 120° C. and 200° C., for 20 minutes to 10 hours, preferably, for 30 minutes to 8 hours.

Production Method (IV)

The production method (IV) is a method of producing magnesium hydroxide particles, which comprises hydrating magnesium oxide in an aqueous medium to obtain a slurry of magnesium hydroxide particles and then hydrothermally treating the slurry, wherein the hydrothermal treatment is carried out in the presence of 0.01 to 150 mol %, based on the magnesium hydroxide, of at least one compound selected from the group consisting of an organic acid, boric acid, silicic acid and water-soluble salts of these.

The production method (IV) substantially differs in that the addition compound is not allowed to be present in the hydration in the above production method (III) but is allowed to be present in the hydrothermal treatment step. The hydration reaction condition in the production method (IV) is therefore substantially not different from the contents explained in the above production method (III). Further, the addition compound for the hydrothermal treatment can be also selected from those explained in the production method (I). The amount of the addition compound is substantially not different as that in the above production method (III) except that it is based on the formed magnesium hydroxide.

The magnesium hydroxide particles intended in the present invention can be obtained by any one of the above methods (I) to (IV). Of the above methods, the production methods (I) and (III) are preferred as compared with the other methods. In these methods in particular, if hydrothermal treatment is carried out after the reaction, there can be obtained particles which are uniform in particle diameter and aspect ratio and have a good product quality.

The obtained magnesium hydroxide particles can be formed into a powder by means such as filtration, drying after dehydration and pulverization.

The magnesium hydroxide particles featured by the above specific aspect ratio in the present invention can be used in various fields, and it has been found that they can be remarkably advantageously used, particularly, as a flame retardant for a synthetic resin.

According to the present invention, therefore, there is provided a flame-retardant resin composition comprising 100 parts by weight of a synthetic resin and 5 to 300 parts by weight, preferably 10 to 250 parts by weight, of magnesium hydroxide particles having an aspect ratio (H) which satisfies the following expression (1), $$0.45 \cdot A \cdot B < H < 1.1 \cdot A \cdot B \quad (1)$$

wherein H is an aspect ratio, A is an average secondary particle diameter (μm) of the particles measured by a laser diffraction scattering method and B is a specific surface area (m$^2$/g) of the particles measured by a BET method.

In the flame-retardant resin composition of the present invention, the above magnesium hydroxide particles of the present invention are used as magnesium hydroxide particles to be incorporated, and they have an aspect ratio (H) in the above (1). As already explained, the magnesium hydroxide particles have characteristic features of the average secondary particle diameter (A), the BET specific surface area (B) and the particle diameter distribution, satisfy the content of the heavy metals as impurities and further, are surface-treated. Explanations of these points are omitted here.

The synthetic resin used in the flame-retardant resin composition of the present invention can be selected from any moldable resins. Examples of such resins include olefin polymers or copolymers such as polyethylene, polypropylene, polybutene-1, poly4-methylpentene, an ethylene-propylene copolymer, an ethylene-butene-1 copolymer, an ethylene-4-methylpentene copolymer, a propylene-butene-1 copolymer, a propylene-4-methylpentene-1 copolymer, an ethylene-acrylate ester copolymer and an ethylene-propylene-diene copolymer; styrene polymers or copolymers such as polystyrene, ABS, AA, AES and AS; vinyl chloride or vinyl acetate polymers or copolymers such as a vinyl chloride resin, a vinyl acetate resin, a vinylidene chloride resin, an ethylene-vinyl chloride copolymer and an ethylene-vinyl acetate copolymer; a phenoxy resin, a butadiene resin, a fluorine resin, a polyacetal resin, a polyamide resin, a polyurethane resin, a polyester resin, a polycarbonate resin, a polyketone resin, amethacryl resin, a diallyl phthalate resin, a phenolic resin, an epoxy resin, a melamine resin, a urea resin, and rubbers such as SBR, BR, CR, CPE, CSM, NBR, IR, IIR and a fluorine rubber.

Of these synthetic resins, thermoplastic resins are appropriate.

Examples of the thermoplastic resins are polyolefins or copolymers thereof for which the magnesium hydroxide particles are excellent in flame-retarding effect, heat-deterioration-preventing effect and the property of retaining mechanical strength. Specific examples thereof include polypropylene resins such as a polypropylene homopolymer and an ethylene-propylene copolymer, polyethylene resins such as high-density polyethylene, low-density polyethylene, linear low-density polyethylene, ultra-low density polyethylene, EVA (ethylene vinyl acetate resin), EEA (ethylene ethyl acrylate resin), EMA (ethylene methyl acrylate copolymer resin), EAA (ethylene acrylate copolymer resin) and ultra-high polyethylene, and polymers or copolymers of $C_2$–$C_6$ olefins (α-ethylene) such as polybutene and poly-4-methylpentene-1.

Further, the synthetic resins include thermosetting resins such as an epoxy resin, a phenolic resin, a melamine resin, an unsaturated polyester resin, an alkyd resin and a urea resin, and synthetic rubbers such as EPDM, butyl rubber, isoprene rubber, SBR, NBR, chlorosulfonatedpolyethylene, NIR, urethane rubber, butadiene rubber, acryl rubber, silicone rubber and a fluorine rubber.

The resin composition of the present invention is substantially constituted of a synthetic resin and the magnesium hydroxide particles, and it may further contain a small amount of a flame-retardant aid. When a flame-retardant aid is incorporated, the amount ratio of the magnesium hydroxide particles can be decreased, and the flame-retarding effect can be enhanced.

The flame-retardant aid is preferably red phosphorus, a carbon powder or a mixture of these. The red phosphorus includes normal red phosphorus used for a flame retardant and others such as red phosphorus surface-coated, for example, with a thermosetting resin, a polyolefin, a carboxylate polymer, titanium oxide or a titanium-aluminum condensate. The carbon powder includes carbon black, activated carbon and graphite. The carbon black may be a product prepared by any one of an oil furnace method, a gas furnace method, a channeling method, a thermal method and an acetylene method.

When the flame-retardant aid is incorporated, properly, the amount thereof based on the total amount of the synthetic resin and the magnesium hydroxide particles is in the range of from 0.5 to 20% by weight, preferably 1 to 15% by weight. The resin composition of the present invention can be prepared by mixing the above synthetic resin, the above magnesium hydroxide particles and optionally, the flame-retardant aid in the above amount according to a method known per se.

The resin composition having anti-heat-deterioration properties and flame retardancy, provided by the present invention, may contain other conventional additives in addition to the above components. The additives include an anti-oxidant, an anti-static agent, a pigment, a foaming agent, a plasticizer, a filler, a reinforcing agent, a crosslinking agent, a photostabilizer, an ultraviolet absorbent and a lubricant.

According to the present invention, therefore, there can be provided a flame-retardant resin composition and a molded article which are substantially halogen-free. With regard to the term "substantially halogen-free", it should be understood that a very small amount of a halogen included as a catalyst component for the production of the synthetic resin and a very small amount of a halogen contained in the above additives incorporated into the resin may be contained. In other words, it should be understood that it means that no halogen incorporated for flame retardancy is contained.

BRIEF DESCRIPTION OF DRAWINGS

FIG. 1

FIG. 1 shows schematic perspective view and a side view of a regular hexagonal prism of a single crystal particle of magnesium hydroxide.

EXPLANATIONS OF SYMBOLS

X: Length of one side of regular hexagonal prism ($\mu$m).
Y: Thickness of prism ($\mu$m)
A: Particle diameter ($\mu$m)

EXAMPLES

The present invention will be explained with reference to Examples hereinafter.

In Examples, (1) an average secondary particle diameter, (2) a BET specific surface area, (3) an aspect ratio and (4) a particle size distribution width of magnesium hydroxide particles mean values obtained by measurements described below.

(1) Average Secondary Particle Diameter of Magnesium Hydroxide Particles

Measured and determined with a MICROTRACK particle size analyzer SPA type (supplied by LEEDS & amp; NORTHRUP INSTRUMENTS). A sample powder in an amount of 700 mg is added to 70 ml of water, and the mixture is supersonically dispersed (MODEL US-300, current 300 $\mu$A, supplied by NISSEI) for 3 minutes. Then, 2 to 4 ml of the dispersion is sampled and added to a sample chamber of the above particle size analyzer retaining 250 ml of degassed water, and the analyzer is operated to circulate a suspension for 2 minutes. Then, the sample is measured for a particle size distribution. The measurement is carried out twice, and an arithmetic mean of 50% accumulated secondary particle diameters obtained by these measurements is calculated, and used as an average secondary particle diameter of the sample.

(2) Specific Surface Area of Magnesium Hydroxide Particles According to BET Method Measured by a liquid nitrogen adsorption method.

(3) Measurement of Aspect Ratio of Magnesium Hydroxide Particles

Magnesium hydroxide particles were taken as having the structure of a single crystal and identical-particle-size-possessing regular hexagonal prism as shown in FIG. 1, X and Y were determined on the basis of found values, calculated values and a documented value shown in the following A to E, and an aspect ratio was calculated.

A ($\mu$m): Average secondary particle diameter (found value)

B ($m^2/g$): BET specific surface area (found value)

C ($m^2$) Surface area per particle (calculated value)

D ($cm^3$): Volume per particle (calculated value)

E ($g/cm^3$): True specific gravity of magnesium hydroxide (documented value)

H: Aspect ratio (calculated value).

$A=(4x^2+y^2)^{1/2}$ $C=(3*3^{1/2}x^2+6xy)*10^{-12}$ $D=3/2*3^{1/2}x^2y*10^{-12}$ $E=2.38$ $B=C/(D*E)$ $H=2x/y$ (wherein $H>1.30$)

x and y are determined on the basis of the above equations, and an aspect ratio is calculated.

(4) Particle Size Distribution Width

An accumulated volume distribution stage in which a particle size was an average secondary particle diameter ×0.3 was determined on the basis of the particle size distribution measured in (1). Then, a value obtained by deducting the above value from a similarly determined accumulated volume distribution stage in which a particle size was an average secondary particle diameter ×1.7 (i.e., a volume ratio of particles satisfying the equation (II)) was taken as a particle size distribution width (%).

Comparative Example 1

An autoclave was charged with 400 ml of a magnesium chloride aqueous solution (Wako Purechemical Ind., Ltd.) adjusted to a concentration of 0.5 mol/L, and while the aqueous solution was stirred, 121 ml of a 3N sodium hydroxide solution was dropwise added. The mixture was allowed to react at room temperature (25° C.) for 30 minutes, to obtain a suspension of magnesium hydroxide particles.

The suspension was hydrothermally treated under conditions of 180° C. and 2 hours or under conditions of 160° C. and 2 hours and dehydrated, then followed by washing with water (200 ml) and drying at 105° C. for 24 hours, to give magnesium hydroxide particles.

Table 1 to be described later shows the average secondary particle diameter, the BET specific surface area, the particle size distribution width and the aspect ratio of each of the obtained samples.

Example 1

An autoclave was charged with 400 ml of a magnesium chloride aqueous solution (Wako Purechemical Ind., Ltd.) adjusted to a concentration of 0.5 mol/L and 0.2 mol %, based on the magnesium chloride, of boric acid (supplied by BORAX), and while the mixture was stirred, 121 ml of a 3N sodium hydroxide solution was dropwise added. The mixture was allowed to react at room temperature (25° C.) for 30 minutes, to obtain a suspension of magnesium hydroxide particles.

The above suspension was hydrothermally treated under the following conditions and dehydrated, then followed by washing with water (200 ml) and drying at 105° C. for 24 hours, to give magnesium hydroxide particles.

Samples of magnesium hydroxide particles obtained under hydrothermal treatment conditions are referred to as Sample A-1 and Sample A-2.

| Hydrothermal treatment conditions | Sample name |
|---|---|
| (1) 180° C., 2 hours | A-1 |
| (2) 160° C., 2 hours | A-2 |

Example 2

An autoclave was charged with 400 ml of a magnesium chloride aqueous solution (Wako Purechemical Ind., Ltd.) adjusted to a concentration of 0.5 mol/L and 1.7 mol %, based on the magnesium chloride, of boric acid (supplied by BORAX), and while the mixture was stirred, 121 ml of a 3N sodium hydroxide solution was dropwise added. The mixture was allowed to react at room temperature (25° C.) for 30 minutes, to obtain a suspension of magnesium hydroxide particles.

The above suspension was hydrothermally treated under the following conditions and dehydrated, then followed by washing with water (200 ml) and drying at 105° C. for 24 hours, to give magnesium hydroxide particles.

Samples of magnesium hydroxide particles obtained under hydrothermal treatment conditions are referred to as Sample B-1 and Sample B-2.

| Hydrothermal treatment conditions | Sample name |
|---|---|
| (1) 180° C., 2 hours | B-1 |
| (2) 160° C., 2 hours | B-2 |

The following Table 1 shows the average secondary particle diameter, the BET specific surface area, the particle size distribution width and the aspect ratio of each of the obtained samples.

TABLE 1

| | No. | CEx. 1 | Ex. 1 | Ex. 2 |
|---|---|---|---|---|
| | Amount of added boric acid (mol %) | not added | 0.2 | 1.7 |
| Hydrothermal treatment conditions 180° C. - 2 hours | Sample No. | | A-1 | B-1 |
| | Particle diameter (μm) | 1.34 | 0.94 | 0.70 |
| | BET specific surface area (m$^2$/g) | 2.9 | 4.9 | 16.2 |
| | Aspect ratio lower limit/upper limit | 1.75/4.27 | 2.07/5.07 | 5.10/12.47 |
| | Aspect ratio | 1.6 | 2.9 | 11.1 |
| | Particle size distribution width (%) | 74 | 74 | 73 |
| Hydrothermal treatment conditions 160° C. - 2 hours | Sample No. | | A-2 | B-2 |
| | Particle diameter (μm) | 0.86 | 0.72 | 0.48 |
| | BET specific surface area (m$^2$/g) | 4.5 | 10.1 | 25.0 |
| | Aspect ratio lower limit/upper limit | 1.74/4.26 | 3.27/8.00 | 5.40/13.20 |
| | Aspect ratio | 1.6 | 6.2 | 11.9 |
| | Particle size distribution width (%) | 75 | 73 | 73 |

Ex. = Example, CEx. = Comparative Example

Comparative Example 2

An autoclave was charged with 400 ml of a magnesium chloride aqueous solution (ion bittern) adjusted to a concentration of 0.5 mol/L, and while the aqueous solution was stirred, 60 ml of a slurry of calcium hydroxide (3 mol/L) was dropwise added. The mixture was allowed to react at room temperature (25° C.) for 30 minutes, to obtain a suspension of magnesium hydroxide particles.

The suspension was hydrothermally treated under conditions of 160° C. and 2 hours and dehydrated, then followed by washing with water (200 ml) and drying at 105° C. for 24 hours to give magnesium hydroxide particles.

Table 2 to be described later shows the average secondary particle diameter, the BET specific surface area, the particle size distribution width and the aspect ratio of the obtained sample.

Example 3

Magnesium hydroxide particles were obtained by carrying out hydrothermal treatment in the same manner as in Comparative Example 2 except that 0.2 mol %, based on magnesium chloride, of boric acid (supplied by BORAX) was added to a magnesium chloride aqueous solution (ion bittern).

Table 2 to be described later shows the average secondary particle diameter, the Bet specific surface area, the particle size distribution width and the aspect ratio of the obtained sample.

Example 4

Magnesium hydroxide particles were obtained by carrying out hydrothermal treatment in the same manner as in Comparative Example 2 except that 0.4 mol %, based on magnesium chloride, of boric acid (supplied by BORAX) was added to a magnesium chloride aqueous solution (ion bittern).

Table 2 to be described later shows the average secondary particle diameter, the BET specific surface area, the particle size distribution width and the aspect ratio of the obtained sample.

TABLE 2

| | No. | CEx. 2 | Ex. 3 | Ex. 4 |
|---|---|---|---|---|
| | Amount of added boric acid (mol %) | not added | 0.2 | 0.4 |
| Hydrothermal treatment conditions 160° C. - 2 hours | Particle diameter (μm) | 0.82 | 0.79 | 0.64 |
| | BET specific surface area (m$^2$/g) | 4.7 | 5.1 | 8.3 |
| | Aspect ratio lower limit/upper limit | 1.73/4.24 | 1.81/4.43 | 2.39/5.84 |
| | Aspect ratio | 1.5 | 2.0 | 3.8 |
| | Particle size distribution width (%) | 74 | 76 | 76 |

CEx. = Comparative Example, Ex. = Example

Comparative Example 3

An autoclave was charged with 400 ml of a magnesium chloride aqueous solution (Wako Purechemical Ind., Ltd.) adjusted to a concentration of 0.5 mol/L, and while the aqueous solution was stirred, 60 ml of a slurry of calcium hydroxide (3 mol/L) was dropwise added. The mixture was allowed to react at room temperature (25° C.) for 30 minutes, to obtain a suspension of magnesium hydroxide particles.

The suspension was hydrothermally treated under conditions of 160° C. and 2 hours and dehydrated, then followed by washing with water (200 ml) and drying at 105° C. for 24 hours, to give magnesium hydroxide particles.

Table 3 to be described later shows the average secondary particle diameter, the BET specific surface area, the particle size distribution width and the aspect ratio of each of the obtained particles.

Example 5

An autoclave was charged with 400 ml of a magnesium chloride aqueous solution (Wako Purechemical Ind., Ltd.) adjusted to a concentration of 0.5 mol/L, and while the aqueous solution was stirred, 60 ml of a slurry of calcium hydroxide (3 mol/L) was dropwise added. The mixture was allowed to react at room temperature (25° C.) for 30 minutes, to obtain a suspension of magnesium hydroxide particles.

To the above suspension was added 12.6 g (44 mol % based on the magnesium hydroxide) of calcium acetate (Wako Purechemical Ind., Ltd.). Further, the mixture was hydrothermally treated under the following conditions and dehydrated, then followed by washing with water (200 ml) and drying at 105° C. for 24 hours, to give magnesium hydroxide particles. Samples of magnesium hydroxide particles obtained under hydrothermal treatment conditions are referred to as Sample C-1 and Sample C-2.

| Hydrothermal treatment conditions | Sample name |
|---|---|
| (1) 160° C., 2 hours | C-1 |
| (2) 120° C., 2 hours | C-2 |

Table 3 to be described later shows the average secondary particle diameter, the BET specific surface area, the particle size distribution width and the aspect ratio of each of the obtained samples.

Example 6

An autoclave was charged with 400 ml of a magnesium chloride aqueous solution (Wako Purechemical Ind., Ltd.) adjusted to a concentration of 0.5 mol/L, and while the aqueous solution was stirred, 60 ml of a slurry of calcium hydroxide (3 mol/L) was dropwise added. The mixture was allowed to react at room temperature (25° C.) for 30 minutes, to obtain a suspension of magnesium hydroxide particles.

To the above suspension was added 37.9 g (133 mol % based on the magnesium hydroxide) of calcium acetate (Wako Purechemical Ind., Ltd.). Further, the mixture was hydrothermally treated under the following conditions and dehydrated, then followed by washing with water (200 ml) and drying at 105° C. for 24 hours, to give magnesium hydroxide particles. Samples of magnesium hydroxide particles obtained under hydrothermal treatment conditions are referred to as Sample D-1 and Sample D-2.

| Hydrothermal treatment conditions | Sample name |
|---|---|
| (1) 160° C., 2 hours | D-1 |
| (2) 120° C., 2 hours | D-2 |

Table 3 to be described later shows the average secondary particle diameter, the BET specific surface area, the particle size distribution width and the aspect ratio of each of the obtained samples.

TABLE 3

| | No. | CEx. 3 | Ex. 5 | Ex. 6 |
|---|---|---|---|---|
| | Amount of added Ca acetate (mol %) | not added | 44 | 133 |
| Hydrothermal treatment conditions 160° C. - 2 hours | Sample No. | | C-1 | D-1 |
| | Particle diameter (μm) | 1.32 | 0.92 | 0.69 |
| | BET specific surface area (m²/g) | 2.9 | 5.3 | 7.8 |
| | Aspect ratio lower limit/upper limit | 1.72/4.21 | 2.19/5.36 | 2.42/5.92 |
| | Aspect ratio | 1.4 | 3.2 | 3.9 |
| | Particle size distribution width (%) | 73 | 78 | 75 |
| Hydrothermal treatment conditions 120° C. - 2 hours | Sample No. | | C-2 | D-2 |
| | Particle diameter (μm) | | 0.73 | 0.59 |
| | BET specific surface area (m²/g) | | 6.3 | 8.0 |
| | Aspect ratio lower limit/upper limit | | 2.07/5.06 | 2.12/5.19 |
| | Aspect ratio | | 2.9 | 3.0 |
| | Particle size distribution width (%) | | 70 | 80 |

Ex. = Example, CEx. = Comparative Example

Comparative Example 4

8 Grams of magnesium oxide obtained by calcining magnesium hydroxide (Kisuma 5, supplied by Kyowa Chemical Industry Co., Ltd.) at a temperature of 1,050° C. for 90 minutes was placed in an autoclave containing 500 ml of a calcium chloride aqueous solution having a concentration of 1.0 mol/L (supplied by Wako Purechamical Ind., Ltd., 25° C.), and hydrated and hydrothermally treated at 170° C. for 4 hours. Then, the resultant product was dehydrated, washed with water (200 ml) and dried at 105° C. for 24 hours, to give magnesium hydroxide particles.

Table 4 to be described later shows the average secondary particle diameter, the BET specific surface area, the particle size distribution width and the aspect ratio of the obtained sample.

Example 7

Magnesium hydroxide particles were obtained by carrying out hydration and hydrothermal treatment in the same manner as in Comparative Example 4 except that 0.5 mol %, based on magnesium hydroxide, of boric acid (supplied by BORAX) was added to a calcium chloride aqueous solution (supplied by Wako Purechamical Ind., Ltd., 25° C.).

Table 4 to be described later shows the average secondary particle diameter, the BET specific surface area, the particle size distribution width and the aspect ratio of the obtained sample.

Example 8

Magnesium hydroxide particles were obtained by carrying out hydration and hydrothermal treatment in the same manner as in Comparative Example 4 except that 1.0 mol %, based on magnesium hydroxide, of boric acid (supplied by BORAX) was added to a calcium chloride aqueous solution (supplied by Wako Purechamical Ind., Ltd., 25° C.).

Table 4 to be described later shows the average secondary particle diameter, the BET specific surface area, the particle size distribution width and the aspect ratio of the obtained sample.

TABLE 4

| No. | | CEx. 4 | Ex. 7 | Ex. 8 |
|---|---|---|---|---|
| Hydrothermal treatment conditions 170° C. - 4 hours | Amount of added boric acid (mol %) | not added | 0.5 | 1.0 |
| | Particle diameter (μm) | 1.11 | 0.77 | 0.69 |
| | BET specific surface area (m$^2$/g) | 3.5 | 6.0 | 8.5 |
| | Aspect ratio lower limit/upper limit | 1.75/4.27 | 2.08/5.08 | 2.64/6.45 |
| | Aspect ratio | 1.6 | 2.9 | 4.5 |
| | Particle size distribution width (%) | 75 | 76 | 78 |

CEx. = Comparative Example, Ex. = Example

Comparative Example 5

A beaker is charged with 75 ml of a magnesium chloride aqueous solution adjusted to a concentration of 4.0 mol/L (Brine, supplied by NEDMAG), and while the aqueous solution is stirred, 225 ml of a calcium chloride aqueous solution adjusted to 0.127 mol/L (supplied by NEDMAG) was dropwise added, and the mixture was stirred at room temperature for 1 hour. The resultant solution was dehydrated and filtered, and a filtrate is sampled.

The total amount of the filtrate was placed in an autoclave, and while the filtrate was stirred, 180 ml of a sodium hydroxide-aqueous solution (3N) was dropwise added. The mixture was allowed to react at room temperature (20° C.) for 20 minutes, to give a suspension of magnesium hydroxide particles.

The above suspension was hydrothermally treated under conditions of 170° C. and 2 hours and dehydrated, then followed by washing with water (300 ml) and drying at 105° C. for 24 hours, to give magnesium hydroxide particles.

Table 5 to be described later shows the average secondary particle diameter, the BET specific surface area, the particle size distribution width and the aspect ratio of the obtained sample.

Example 9

Magnesium hydroxide particles were obtained by carrying out hydrothermal treatment in the same manner as in Comparative Example 5 except that 0.3 mol %, based on the magnesium chloride, of boric acid (supplied by BORAX) was added to the sampled filtrate in Comparative Example 5.

Table 5 to be described later shows the average secondary particle diameter, the BET specific surface area, the particle size distribution width and the aspect ratio of the obtained sample.

Example 10

Magnesium hydroxide particles were obtained by carrying out hydrothermal treatment in the same manner as in Comparative Example 5 except that 0.4 mol %, based on the magnesium chloride, of boric acid (supplied by BORAX) was added to the sampled filtrate in Comparative Example 5.

Table 5 to be described later shows the average secondary particle diameter, the BET specific surface area, the particle size distribution width and the aspect ratio of the obtained sample.

TABLE 5

| No. | | CEx. 5 | Ex. 9 | Ex. 10 |
|---|---|---|---|---|
| Hydrothermal treatment conditions 170° C. - 2 hours | Amount of added boric acid (mol %) | not added | 0.3 | 0.4 |
| | Particle diameter (μm) | 1.01 | 0.77 | 0.69 |
| | BET specific surface area (m$^2$/g) | 3.8 | 6.3 | 7.9 |
| | Aspect ratio lower limit/upper limit | 1.73/4.22 | 2.18/5.34 | 2.45/6.00 |
| | Aspect ratio | 1.5 | 3.2 | 4.0 |
| | Particle size distribution width (%) | 75 | 75 | 76 |

CEx. = Comparative Example, Ex. = Example

Comparative Example 6

An autoclave was charged with 400 ml of a magnesium chloride aqueous solution (ion bittern) adjusted to a concentration of 0.5 mol/L, and while the aqueous solution was stirred, 60 ml of a slurry of calcium hydroxide (3 mol/L) was dropwise added. The mixture was allowed to react at room temperature (25° C.) for 30 minutes, to obtain a suspension of magnesium hydroxide particles.

The suspension was hydrothermally treated under conditions of 170° C. and 2 hours and dehydrated, then followed by washing with water (200 ml) and drying at 105° C. for 24 hours to give magnesium hydroxide particles.

Table 6 to be described later shows the average secondary particle diameter, the BET specific surface area, the particle size distribution width and the aspect ratio of the obtained sample.

Example 11

Magnesium hydroxide particles were obtained by carrying out hydrothermal treatment in the same manner as in Comparative Example 6 except that 0.02 mol %, based on magnesium hydroxide, of water glass adjusted to SiO$_2$= 1.084 g/l (Wako Purechemical Ind., Ltd.) was added to an obtained suspension in Comparative Example 6.

Table 6 to be described later shows the average secondary particle diameter, the BET specific surface area, the particle size distribution width and the aspect ratio of the obtained sample.

Example 12

Magnesium hydroxide particles were obtained by carrying out hydrothermal treatment in the same manner as in Comparative Example 6 except that 0.05 mol %, based on magnesium hydroxide, of water glass adjusted to SiO$_2$= 1.084 g/l (Wako Purechemical Ind., Ltd.) was added to an obtained suspension in Comparative Example 6.

Table 6 to be described later shows the average secondary particle diameter, the BET specific surface area, the particle size distribution width and the aspect ratio of the obtained sample.

TABLE 6

| | No. | CEx. 6 | Ex. 11 | Ex. 12 |
|---|---|---|---|---|
| | Amount of added water glass (mol %) | not added | 0.02 | 0.05 |
| Hydrothermal treatment conditions 170° C. - 2 hours | Particle diameter (μm) | 1.04 | 0.75 | 0.70 |
| | BET specific surface area (m²/g) | 3.7 | 7.2 | 8.8 |
| | Aspect ratio lower limit/upper limit | 1.73/4.23 | 2.43/5.94 | 2.77/6.78 |
| | Aspect ratio | 1.5 | 3.9 | 4.9 |
| | Particle size distribution width (%) | 75 | 77 | 76 |

CEx. = Comparative Example, Ex. = Example

Comparative Example 7

An autoclave was charged with 400 ml of a magnesium chloride aqueous solution (ion bittern) adjusted to a concentration of 0.5 mol/L, and while the aqueous solution was stirred, 60 ml of a slurry of calcium hydroxide (3 mol/L) was dropwise added. The mixture was allowed to react at room temperature (25° C.) for 30 minutes, to obtain a suspension of magnesium hydroxide particles.

The suspension was hydrothermally treated under conditions of 170° C. and 2 hours and dehydrated, then followed by washing with water (200 ml) and drying at 105° C. for 24 hours to give magnesium hydroxide particles.

Table 7 to be described later shows the average secondary particle diameter, the BET specific surface area, the particle size distribution width and the aspect ratio of the obtained sample.

Example 13

Magnesium hydroxide particles were obtained by carrying out hydrothermal treatment in the same manner as in Comparative Example 7 except that 1.206 g (5 mol % based on magnesium hydroxide) of sodium oxalate (Wako Purechemical Ind., Ltd.) was added to an obtained suspension in Comparative Example 7.

Table 7 to be described later shows the average secondary particle diameter, the BET specific surface area, the particle size distribution width and the aspect ratio of the obtained sample.

Example 14

Magnesium hydroxide particles were obtained by carrying out hydrothermal treatment in the same manner as in Comparative Example 7 except that 3.618 g (15 mol % based on magnesium hydroxide) of sodium oxalate (Wako Purechemical Ind., Ltd.) was added to an obtained suspension in Comparative Example 7.

Table 7 to be described later shows the average secondary particle diameter, the BET specific surface area, the particle size distribution width and the aspect ratio of the obtained sample.

TABLE 7

| | No. | CEx. 7 | Ex. 13 | Ex. 14 |
|---|---|---|---|---|
| | Amount of added sodium oxalate (mol %) | not added | 5 | 15 |
| Hydrothermal treatment conditions 170° C. - 2 hours | Particle diameter (μm) | 1.38 | 0.86 | 0.81 |
| | BET specific surface area (m²/g) | 2.8 | 6.0 | 7.9 |
| | Aspect ratio lower limit/upper limit | 1.74/4.25 | 2.32/5.68 | 2.88/7.04 |
| | Aspect ratio | 1.6 | 3.6 | 5.2 |
| | Particle size distribution width (%) | 75 | 75 | 76 |

CEx. = Comparative Example, Ex. = Example

Examples 15 and 16, and Comparative Example 8

The magnesium hydroxide particles obtained in the above Comparative Example 1, Example 1 and Example 2 (samples obtained by hydrothermal treatment at 180° C. for 2 hours) were surface-treated with isopropyltriisostearoyl titanate such that it adhered in an amount of 2% by weight based on the magnesium hydroxide particles. Table 8 shows measurement values before the surface treatment.

Then, 150 parts by weight of the obtained magnesium hydroxide particles, 100 parts by weight of an ethylene-vinyl acetate copolymer resin and 0.2 part by weight of an antioxidant (Irganox 1010, supplied by Ciba Special Chemicals) were mixed to prepare three mixtures in an amount of 10 kg each. Each mixture was separately kneaded with a single-screw extruder at 220° C. to prepare kneaded pellets. Further, the pellets were formed into a sheet form with a compression molding machine at 220° C., obtained sheets were processed into test pieces, and the test pieces were measured for physical properties and flame retardancy. Table 8 shows the results.

In Table 8, the total content of heavy metals shows a total content of heavy metals (Fe, Mn, Co, Cr, Cu, V and Ni) in the magnesium hydroxide particles.

TABLE 8

| | CEx. 8 | Ex. 15 | Ex. 16 |
|---|---|---|---|
| Physical properties of magnesium hydroxide particles | | | |
| Average secondary particle diameter (μm) | 1.34 | 0.94 | 0.70 |
| BET specific surface area (m²/g) | 2.9 | 4.9 | 16.2 |
| Aspect ratio | 1.6 | 2.9 | 11.1 |
| Lower limit and upper limit of aspect ratio | 1.75/4.27 | 2.07/5.07 | 5.10/12.5 |
| Ratio of amount within particle size distribution width (%) | 74 | 74 | 73 |
| Total content of heavy metals (%) | 0.0019> | 0.0018> | 0.0010> |
| Physical properties of resin composition | | | |
| Appearance | good | good | good |
| Tensile strength (kgf/mm²) | 0.48 | 0.76 | 1.05 |
| Flame retardancy test UL-94 V (⅛ inch) | V-0 | V-0 | V-0 |
| Number of days before whitening (days) | 36 | 36 | 35 |
| Weight loss by 10% by weight (hour) | 831 | 825 | 810 |

CEx. = Comparative Example, Ex. = Example

Comparative Example 9

8 Grams of magnesium oxide prepared by calcining magnesium hydroxide (total content of heavy metals 0.0351 wt %) at a temperature of 1,050° C. for 90 minutes was placed in an autoclave containing 500 ml of a calcium chloride aqueous solution having a concentration of 1.0 mol/L (Wako Purechemical Ind., Ltd., 25° C.), hydrated and hydrothermally treated at 170° C. for 4 hours and dehydrated, then followed by washing with water (200 ml) and drying at 105° C. for 24 hours, to obtain magnesium hydroxide particles.

The obtained sample was measured or determined for an average secondary particle diameter, a BET specific surface area, a particle size distribution width and aspect ratio.

Examples 17 and 18, and Comparative Example 10

The magnesium hydroxide particles obtained in the above Comparative Example 9, Example 7 and Example 8 were respectively emulsified in water. Emulsification products were heated to 80° C. and surface-treated by adding 2% by weight, based on the magnesium hydroxide particles, of stearic acid. Then, the products were dehydrated, dried and pulverized. Each sample before the surface treatment was measured for an average secondary particle diameter, a BET specific surface area, a particle size distribution width and an aspect ratio. Table 9 shows the results.

150 Parts by weight of the obtained magnesium hydroxide particles, 100 parts by weight of a polypropylene resin and 1 part by weight of an antioxidant were mixed to prepare mixtures in an amount of 10 kg each. The mixtures were respectively kneaded with a twin-screw extruder to prepare kneaded pellets. Further, the pellets were injection-molded to obtain test pieces, and then the test pieces were measured for physical properties, flame retardancy and thermal stability. Table 9 shows the results.

(i) Method of preparation of the test pieces, (ii) measurement of thermal stability, (iii) tensile strength test and (iv) flexural strength and flexural modulus test were as follows.

(i) Method of Preparation of the Test Pieces

Surface-treated magnesium hydroxide particles of each sample were pre-dried under conditions of 105° C.×16 hours and further under conditions of 120° C.×2 hours for removing adhering water, and then kneaded in a twin-screw extruder together with a resin (polypropylene) and an antioxidant at 230° C., and each sample was further dried under conditions of 120° C.×2 hours and molded with an injection molding machine at 230° C.

Twin-screw extruder; supplied by Plastic Kogaku Kenkyusho
BT-30-S2-30-L
Injection molding machine; supplied by Nissin Jushi Kogyo K. K.
FS 120S 18A SE (ii) Measurement of Thermal Stability
Machine: Gear Open GPHH-100, supplied by Tabaiespec
Setting conditions: 150° C., damper opening degree 50%
Test pieces were used as sets of two test pieces each. Each set was pressed with paper on both sides in an upper portion, held with a crip, suspended from a rotary ring and taken off with the passage of time.
Test pieces: 1/12 inch
Evaluation: A time period taken before whitening was observed on a test piece was used as an index for heat deterioration. Further, a time period taken before a weight loss by 10% by weight of the test piece at 150° C. took place.

(iii) Tensil Strength Test
According to JIS K 7113.

(iv) Flexural Strength, Flexural Modulus Test

According to JIS K 7203.

TABLE 9

|  | CEx. 9 | Ex. 17 | Ex. 18 |
|---|---|---|---|
| Physical properties of magnesium hydroxide particles | | | |
| Average secondary particle diameter (μm) | 0.63 | 0.77 | 0.69 |
| BET specific surface area (m²/g) | 20.2 | 6.0 | 8.5 |
| Aspect ratio | 12.8 | 2.9 | 4.5 |
| Lower limit and upper limit of aspect ratio | 5.73/14.00 | 2.08/5.08 | 2.64/6.45 |
| Ratio of amount within particle size distribution width (%) | 75 | 76 | 78 |
| Total content of heavy metals (%) | 0.0362> | 0.0018> | 0.0020> |
| Physical properties of resin composition | | | |
| Appearance (visually observed) | poor | good | good |
| Tensile strength (kgf/mm²) | 1.29 | 1.78 | 1.89 |
| Flexural strength (kgf/mm²) | 3.02 | 3.64 | 3.77 |
| Flexural modulus (kgf/mm²) | 453 | 515 | 638 |
| Flame retardancy test UL-94 V (1/8 inch) | V-0 | V-0 | V-0 |
| Number of days before whitening (days) | 8 | 37 | 35 |
| Weight loss by 10% by weight (hour) | 210 | 827 | 830 |

CEx. = Comparative Example, Ex. = Example

Comparative Example 11

An autoclave was charged with 400 ml of a magnesium chloride aqueous solution (ion bittern) adjusted to a concentration of 0.5 mol/L, and while the aqueous solution was stirred, 60 ml of a slurry of calcium hydroxide (3 mol/L) was dropwise added. The mixture was allowed to react at room temperature (25° C.) for 30 minutes, to obtain a suspension of magnesium hydroxide particles.

The suspension was hydrothermally treated under conditions of 160° C. and 2 hours and dehydrated, then followed by washing with water (200 ml) and drying at 105° C. for 24 hours to give magnesium hydroxide particles.

The obtained magnesium hydroxide particles were measured or determined for an average secondary particle diameter, a BET specific surface area, a particle size distribution width and an aspect ratio.

Examples 19 and 20, and Comparative Example 12

The magnesium hydroxide particles obtained in the above Comparative Example 11, Example 5 and Example 6 (hydrothermal treatment conditions 160° C.—2 hours) were respectively washed with water and emulsified. Each emulsification product was heated to 80° C., and surface-treated by adding 3% by weight, based on the magnesium hydroxide, of sodium oleate, followed by dehydration, drying and pulverization. The obtained samples before the surface-treatment were measured for an average secondary particle diameter, a BET specific surface area, a particle size distribution width and an aspect ratio. Table 10 shows the results.

180 Parts by weight of the obtained magnesium hydroxide particles, 100 parts by weight of a polypropylene resin and 1 part by weight of an antioxidant were mixed to prepare three mixtures in an amount of 10 kg each. Each mixture was separately kneaded with a single-screw extruder to prepare kneaded pellets. Further, the pellets were injection-molded to prepare test pieces, and the test pieces were measured for physical properties and flame retardancy. Table 10 shows the results.

TABLE 10

|  | CEx. 12 | Ex. 19 | Ex. 20 |
|---|---|---|---|
| Physical properties of magnesium hydroxide particles | | | |
| Average secondary particle diameter (μm) | 0.55 | 0.92 | 0.69 |
| BET specific surface area (m$^2$/g) | 47.9 | 5.3 | 7.8 |
| Aspect ratio | 29.0 | 3.2 | 3.9 |
| Lower limit and upper limit of aspect ratio | 11.86/28.98 | 2.19/5.36 | 2.42/5.92 |
| Ratio of amount within particle size distribution width (%) | 72 | 78 | 75 |
| Total content of heavy metals (%) | 0.2102> | 0.0040> | 0.0034> |
| Physical properties of resin composition | | | |
| Appearance (visually observed) | poor | good | good |
| Tensile strength (kgf/mm$^2$) | 1.21 | 1.82 | 1.84 |
| Flexural strength (kgf/mm$^2$) | 2.88 | 3.62 | 3.73 |
| Flexural modulus (kgf/mm$^2$) | 425 | 597 | 621 |
| Flame retardancy test UL-94 V (1/12 inch) | V-0 | V-0 | V-0 |
| Number of days before whitening (days) | 4 | 25 | 27 |
| Weight loss by 10% by weight (hour) | 120 | 620 | 670 |

CEx. = Comparative Example, Ex. = Example

Example 21

The following resin compositions (1) to (3) were prepared, and test pieces were prepared therefrom in the same manner as in Examples 15 and 16 and evaluated for flame retardancy. When the resin was Nylon 6 in (1), kneading and injection molding were carried out at 250° C. As a result, the test pieces from the resin compositions (1) and (2) showed a flame retardancy of V-0 under UL94-V 1/16 inch. The test piece from the resin composition (3) showed a flame retardancy of V-0 under UL94-V 1/8 inch.

(1) Resin Composition
  190 parts by weight, Magnesium hydroxide particles (test sample A-1 in Example 1)
  100 parts by weight, Nylon 6 (specific gravity 1.14, injection molding grade)
  0.2 part by weight, Antioxidant (Irganox 1096, Ciba Special Chemicals)

(2) Resin Composition
  210 parts by weight, Magnesium hydroxide particles (test sample A-1 in Example 1)
  100 parts by weight, High-density polyethylene (MFI 5.0 g/10 minutes, injection molding grade)
  0.25 part by weight, Antioxidant (Irganox 1010, Ciba Special Chemicals)
  0.25 part by weight, Antioxidant (DLTP, supplied by Yoshitomi Pharmaceuticals)

(3) Resin Composition
  10 parts by weight, Magnesium hydroxide particles (test sample B-1 in Example 2 which was altered by surface treatment with 0.3%, based on magnesium hydroxide particles, of γ-aminopropyltrimethoxysilane)
  10 part by weight, Red phosphorus (Novaexcel 140, supplied by Rin Kagaku Kogyo)
  5 parts by weight, Carbon black (oil furnace method, FEF)
  95 parts by weight, ABS resin (MFR 25 g/10 minutes, impact resistance grade)
  5 parts by weight, Nylon 6 (specific gravity 1.14, injection molding grade)
  0.2 part by weight, Antioxidant (Irganox 1010, Ciba Special Chemicals)

Example 22

The following resin composition was prepared and masticated with an oven roll at 70° C., and after one day, the mastication product was vulcanized at 160° C. for 30 minutes, to give a plate havign a thickness of 1/8 inch. Then, a 1/8 inch thick test piece for UL94-V test was prepared from the plate. The test piece was subjected to the UL94-V test. The test result was that the test piece had a flame retardancy of V-1.

Composition
  100 parts by weight, EPDM rubber (ethylene/propylene ratio=50/50 mol)
  170 parts by weight, Magnesium hydroxide particles (test sample A-1 in Example 1)
  3 parts by weight, Dicumyl peroxide
  0.5 part by weight, poly(2,2,4-trimethyl-1,2-dihydroquinoline)
  1 part by weight, Silane coupling agent (A-172, supplied by Nippon Unitika)
  1 part by weight, Stearic acid
  1 part by weight, Sulfur

Example 23

The following composition was prepared and kneaded with a kneader at approximately 30° C. The kneaded mixture was cured at 90° C. for 15 minutes, to give a 1/8 inch thick plate. Then, a 1/8 inch thick test piece for UL94-V test was prepared from the plate. The test piece was subjected to the UL94-V test. The test result was that the test piece had a flame retardancy of V-0.

Composition
  100 parts by weight, Epoxy resin (specific gravity 1.17)
  100 parts by weight, Magnesium hydroxide particles (test sample A-1 in Example 1)
  5 parts by weight, Red phosphorus (Novaexcel 140, supplied by Rin Kagaku)
  1 part by weight, Carbon black (oil furnace method, FEF)
  10 parts by weight, Curing agent (HY951, supplied by Ciba Special Chemicals)
  1 part by weight, Stearic acid
  0.2 part by weight, Irganox 1010

What is claimed is:

1. Magnesium hydroxide particles having a hexagonal crystal form and having an aspect ratio (H) which satisfies the following expression (I), $$0.45 \cdot A \cdot B < H < 1.1 \cdot A \cdot B \tag{I}$$

wherein H is an aspect ratio, A is an average secondary particle diameter (μm) of all of the magnesium hydroxide particles measured by a laser diffraction scattering method and B is a specific surface area (m$^2$/g) of all of magnesium hydroxide particles measured by a BET method and wherein a volume ratio of magnesium hydroxide particles having a secondary particle diameter (F) satisfying the following expression (II) is at least 60% based on a volume of all of magnesium hydroxide particles, $$0.3 \cdot A < F < 1.7 \cdot A \tag{II}$$

wherein F is a width of a secondary particle diameter (μm) distribution of the magnesium hydroxide particles, and A is as defined in the expression (I).

2. The magnesium hydroxide particles of claim 1, wherein the aspect ratio (H) satisfies the following expression (I-a), $$0.50 \cdot A \cdot B < H < 1.1 \cdot A \cdot B \quad \text{(I-a)}$$

wherein A and B are as defined in the expression (I).

3. The magnesium hydroxide particles of claim 1, which have an average secondary particle diameter (A) measured by a laser diffraction scattering method, of 0.15 to 5.0 μm.

4. The magnesium hydroxide particles of claim 1, which have an average secondary particle diameter (A) measured by a laser diffraction scattering method, of 0.50 to 3.0 μm.

5. The magnesium hydroxide particles of claim 1, which have a specific surface area (B), measured by a BET method, of 1 to 150 m²/g.

6. The magnesium hydroxide particles of claim 1, which have a specific surface area (B), measured by a BET method, of 2 to 130 m²/g.

7. The magnesium hydroxide particles of claim 1, wherein a total content, as a metal, of an iron compound and a manganese compound, as impurities, respectively, is 0.01% by weight or less.

8. The magnesium hydroxide particles of claim 1, wherein a total content, as a metal, of an iron compound, a manganese compound, as impurities, respectively, a cobalt compound, a chromium compound, a copper compound, a vanadium compound and a nickel compound is 0.02% by weight or less.

9. The magnesium hydroxide particles of claim 1, which are magnesium hydroxide particles surface treated with at least one surface-treating agent selected from the group consisting of higher fatty acids, anionic surfactants, phosphate esters, coupling agents and esters formed from polyhydric alcohols and fatty acids.

10. A flame retardant comprising magnesium hydroxide particles having a hexagonal crystal form and having an aspect ratio (H) which satisfies the following expression (I), $$0.45 \cdot A \cdot B < H < 1.1 \cdot A \cdot B \quad \text{(I)}$$

wherein H is an aspect ratio, A is an average secondary particle diameter (μm) of all of magnesium hydroxide particles measured by a laser diffraction scattering method and B is a specific surface area (m²/g) of all of magnesium hydroxide particles measured by a BET method and wherein a volume ratio of magnesium hydroxide particles having a secondary particle diameter (F) satisfying the following expression (II) is at least 60% based on a volume of all of magnesium hydroxide particles, $$0.3 \cdot A < F < 1.7 A \quad \text{(II)}$$

wherein F is a width of a secondary particle diameter (μm) distribution of the magnesium hydroxide particles, and A is as defined in the expression (I).

11. The flame retardant of claim 10, wherein the magnesium hydroxide particles have an aspect ratio (H) satisfying the following expression (I-a), $$0.50 \cdot A \cdot B < H < 1.1 \cdot A \cdot B \quad \text{(I-a)}$$

wherein A and B are as defined in the expression (I).

12. The flame retardant of claim 10, wherein the magnesium hydroxide particles have a specific surface area (B), measured by a BET method, of 30 m²/g or less.

13. The flame retardant of claim 10, wherein the magnesium hydroxide particles have a specific surface area (B), measured by a BET method, of 3 to 20 m²/g.

14. The flame retardant of claim 10, wherein the magnesium hydroxide particles have a specific surface area (B), measured by a BET method, of 3 to 10 m²/g.

15. The flame retardant of claim 10, wherein the magnesium hydroxide particles have a total content of an iron compound and a manganese compound, as impurities, respectively, as a metal, of 0.01% by weight or less.

16. The flame retardant of claim 10, wherein the magnesium hydroxide particles have a total content of an iron compound, a manganese compound, as impurities, respectively, a cobalt compound, a chromium compound, a copper compound, a vanadium compound and a nickel compound, as a metal, of 0.02% by weight or less.

17. A flame-retardant resin composition comprising 100 parts by weight of a synthetic resin and 5 to 300 parts by weight of magnesium hydroxide particles having a hexagonal crystal form and having an aspect ratio (H) which satisfies the following expression (I), $$0.45 \cdot A \cdot B < H < 1.1 \cdot A \cdot B \quad \text{(I)}$$

wherein H is an aspect ratio, A is an average secondary particle diameter (μm) of all of magnesium hydroxide particles measured by a laser diffraction scattering method and B is a specific surface area (m²/g) of all of magnesium hydroxide particles measured by a BET method, wherein a volume ratio of the magnesium hydroxide particles included in a width of a secondary particle diameter (F) distribution represented by the following expression (II) is at least 60% based on a volume of all of magnesium hydroxide particles, $$0.3 \cdot A < F < 1.7 \cdot A \quad \text{(II)}$$

wherein F is a width of a secondary particle diameter (μm) distribution of the magnesium hydroxide particles, and A is an average secondary particle diameter (μm) of all of magnesium hydroxide particles measured by a laser diffraction scattering method.

18. The flame-retardant resin composition of claim 17, wherein the magnesium hydroxide particles have a specific surface area (B), measured by a BET method, of 30 m²/g or less.

19. The flame-retardant resin composition of claim 17, wherein the magnesium hydroxide particles have a specific surface area (B), measured by a BET method, of 3 to 20 m²/g.

20. The flame-retardant resin composition of claim 17, wherein the magnesium hydroxide particles have a specific surface area (B), measured by a BET method, of 3 to 10 m²/g.

21. The flame-retardant resin composition of claim 17, wherein the magnesium hydroxide particles are magnesium hydroxide particles surface-treated with at least one surface-treating agent selected from the group consisting of higher fatty acids, anionic surfactants, phosphate esters, coupling agents and esters formed from polyhydric alcohols and fatty acids.

22. The flame-retardant resin composition of claim 17, wherein the magnesium hydroxide particles have a total content of an iron compound and a manganese compound, as impurities, respectively, as a metal, of 0.01% by weight or less.

23. The flame-retardant resin composition of claim 17, wherein the magnesium hydroxide particles have a total content of an iron compound, a manganese compound, as impurities, respectively, a cobalt compound, a chromium compound, a copper compound, a vanadium compound and a nickel compound, as a metal, of 0.02% by weight or less.

24. The flame-retardant resin composition of claim 17, which further contains 0.5 to 20% by weight, based on a total weight of (a) the synthetic resin and (b) the magnesium hydroxide particles, of (c) a flame-retardant aid.

25. The synthetic resin composition of claim 24, wherein the flame-retardant aid is red phosphorus, a carbon powder or a mixture of these.

26. A molded article formed of the resin composition recited in claim 17.

27. The molded article of claim 26, which substantially does not contain any halogen.

* * * * *